United States Patent [19]

Hendrickson

[11] 4,187,871

[45] Feb. 12, 1980

[54] PRESSURE-BIASED SHUTTLE VALVE

[75] Inventor: Richard C. Hendrickson, St. Charles, Mo.

[73] Assignee: The United States of America as represented by the Secretary of the Navy, Washington, D.C.

[21] Appl. No.: 877,200

[22] Filed: Feb. 13, 1978

[51] Int. Cl.[2] .......... G05D 11/00

[52] U.S. Cl. .......... 137/112

[58] Field of Search .......... 137/112, 113

[56] References Cited

U.S. PATENT DOCUMENTS

| | | | |
|---|---|---|---|
| 1,849,702 | 3/1932 | Bard | 137/113 |
| 2,358,228 | 9/1944 | Hoof | 137/113 |
| 2,685,296 | 8/1954 | Boosman | 137/112 |
| 2,705,501 | 4/1955 | Fritzsch | 137/112 |
| 2,811,979 | 11/1957 | Presnell | 137/112 |
| 2,821,972 | 2/1958 | Banker | 137/112 |
| 2,966,920 | 1/1961 | Oglesby et al. | 137/113 |
| 3,224,455 | 12/1965 | Alfieri | 137/113 |
| 3,439,579 | 4/1969 | Guinot | 137/112 |
| 3,570,521 | 3/1971 | Kirschenman | 137/112 |
| 3,642,020 | 2/1972 | Payne | 137/112 |
| 4,018,244 | 4/1977 | Burns | 137/112 |

FOREIGN PATENT DOCUMENTS

| | | | |
|---|---|---|---|
| 765557 | 6/1934 | France | 137/112 |
| 72801 | 4/1960 | France | 137/112 |
| 271977 | 8/1970 | U.S.S.R. | 137/112 |

*Primary Examiner*—William R. Cline
*Assistant Examiner*—H. Jay Spiegel
*Attorney, Agent, or Firm*—R. S. Sciascia; Paul S. Collignon

[57] ABSTRACT

An improved shuttle valve for providing control of fluid from two alternate sources to a fluid-actuated mechanism. Primary and secondary fluid sources are coupled to supply fluid to a shuttle valve for transmission to a single outlet port. A bias piston having a passage axially extending therethrough is slidably positioned to engage the shuttle and impart movement in response to fluid pressure from the primary source. A bias source is coupled to vary the pressure on the piston and thus change the net bias needed to allow fluid from the primary source to maintain the shuttle in a first position. Initially, when the shuttle is in the first position, fluid flows from the primary source to the single outlet. Subsequently, when the pressure from the primary source falls below a predetermined value, the fluid pressure from the secondary source moves the shuttle to enable fluid flow from the secondary source to the single outlet.

8 Claims, 2 Drawing Figures

PRESSURE-BIASED SHUTTLE VALVE

BACKGROUND OF THE INVENTION

The present invention relates to an improved valve structure and, more particularly, to a shuttle valve for enabling the selective supply of fluid from alternate sources through a single outlet.

In the prior art, shuttle valves are generally used to control the application of fluid to fluid-actuated mechanisms when it is desired to provide fluid from one of two alternate sources at any given time. Such a control arrangement usually employs a shuttle valve structure which provides fluid from a primary source to an outlet port until the pressure of the primary source decreases to a particular value. At that time, a secondary source is coupled to the outlet port by valve action. A shuttle device of this type, however, encounters several problems when equal pressures are supplied from both fluid sources. Thus, when the system must initially be operated with fluid sources at the same or nearly equal pressures, the shuttle may oscillate causing intermittent fluid flow from each source or stabilize at an intermediate position effectively shutting off the flow of fluid from both sources. While various techniques have been proposed to overcome such problems, none has successfully achieved stable operation without significant disadvantages.

By way of example, one such shuttle valve incorporates a detent configuration which enables the shuttle to be seated in only one of two positions in order that flow from only one of the sources may be provided to the outlet at any given time. In addition to being more complex, such a configuration requires the expenditure of a threshold level of pressure to overcome the force of the particular detent involved. While the configuration may prevent the shuttle from stabilizing at an intermediate position, the same also restricts use of the shuttle device to systems having the particular pressure characteristics capable of providing detent shuttle action.

In regard to the problem of oscillation, the prior art has included a spring bias shuttle configuration wherein a spring causes the shuttle to normally remain seated in one position and thereby provide fluid flow from a primary supply to an outlet port. Following a decrease in fluid pressure at the primary source, the secondary source, having a pressure sufficient to overcome the spring bias, causes the shuttle to shift to a second position such that fluid from the secondary source will be coupled to the outlet port. With this technique, however, one of the fluid sources must expend a significant amount of energy to keep the shuttle positioned against the spring bias in order to enable fluid flow from that source to the outlet. In those instances where such a source is of limited energy, the energy loss caused by fluid biasing of the spring loaded shuttle may be detrimental to system operation. Thus, the use of the shuttle is again restricted by its particular configuration to systems of fluid supply having specific pressure or energy characteristics.

Accordingly, the present invention has been developed to overcome the specific shortcomings of the above known and similar techniques and to provide a versatile shuttle valve for enabling fluid control under a variety of conditions.

SUMMARY OF THE INVENTION

It is therefore an object of the present invention to provide an improved valve for controlling fluid flow from alternate sources to a single outlet.

Another object of the invention is to provide a shuttle valve which may be adjusted to provide stable operation for fluid sources initially having substantially equal pressures.

A further object of the invention is to provide a shuttle valve capable of providing an adjustable level of pressure response for shuttle operation.

A still further object of the invention is to provide a shuttle valve which prevents oscillation during the application of substantially equal fluid pressures from two different sources.

Yet another object of the invention is to provide a shuttle valve which decreases the energy required to insure stable operation of the valve.

In order to accomplish the above and other objects, the shuttle valve is constructed to include an elongate body having an axial bore extending along the length of the body, and first and second counterbores axially spaced along the bore. Primary and secondary fluid sources are coupled to either end of the axial bore to provide fluid to the first and second counterbores. A channel extends through the wall of the valve body and intersects the first counterbore to provide a single fluid outlet. A second channel extends through the wall of the valve body and intersects the second counterbore to form a fluid passage. The shuttle is slidably retained within the first counterbore and contacts a bias piston extending from the first counterbore to within the second counterbore. The bias piston includes a channel providing for the flow of fluid between the first and second counterbore and acts to impart movement to the shuttle in response to fluid pressure on the piston in the second counterbore. In a first position, fluid from the primary source flows from the second counterbore through the bias piston to the first counterbore to the outlet port. Following a change in pressure at the primary source, the secondary source forces the shuttle to a second position allowing fluid flow from the secondary source to the outlet port. By adjusting the pressure applied through the second channel and controlling the effective area of the bias piston, the pressure required for stable operation can be varied over a wide range of values and minimize the expenditure of significant amounts of energy for maintaining shuttle position.

Other objects, advantages, and novel features of the invention will become apparent from the following detailed description of the invention when considered with the accompanying drawings wherein:

BRIEF DESCRIPTION OF A PREFERRED EMBODIMENT

Figure 1:
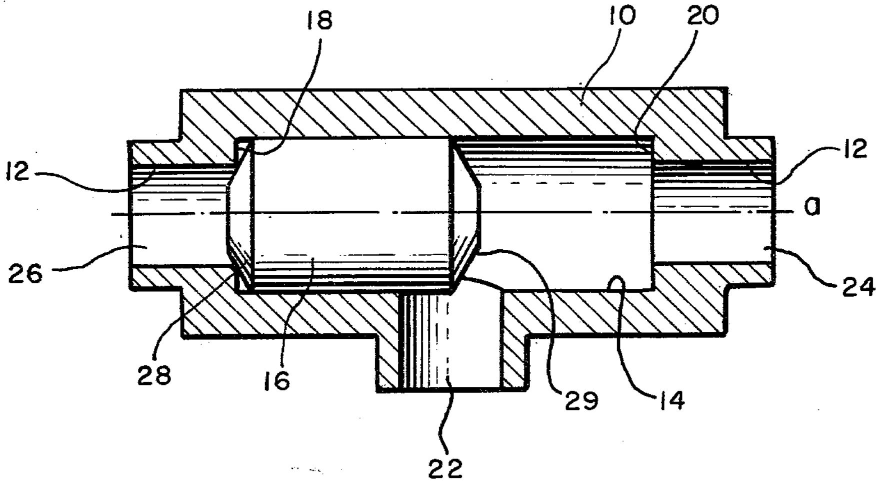
FIG. 1 (PRIOR ART)
FIG. 1 is a schematic diagram of a shuttle valve in accordance with the prior art.

Referring now to FIG. 1, there is shown a schematic diagram of a conventional shuttle valve which includes an elongate valve body 10 having a cylindrical bore 12 with an axis a extending therethrough. The valve includes a counterbore 14 positioned centrally within the valve body 10 and having a diameter larger than the diameter of the bore 12 so as to form shoulders 18 and 20. A shuttle 16 is slidably positioned within the counterbore 14 and is constructed with a configuration for enabling it to move axially along the counterbore 14 between the shoulders 18 and 20. As is known, when the axial counterbore 14 has a cylindrical configuration, the shuttle 16 will also be formed as a cylinder to enable slidable engagement of the shuttle surface throughout the diameter of the counterbore without substantial leakage of fluid between the surface of the shuttle 16 and counterbore 14. In addition, the body 10 may include sealing rings (e.g., such as O-rings in a recess in the counterbore) in order to prevent fluid flow between the identified surfaces.

A second bore 22 extends from the outside of the valve body 10 to intersect the counterbore 14 and thereby provide a passage for fluid flow therebetween. At either end of the valve body 10, the axial bore 12 forms inlet ports 24 and 26 which communicate with the counterbore 14 to provide fluid pressure from primary and secondary sources (not shown) to the shuttle 16. The shuttle 16 may have beveled surfaces 28 and 29 which contact shoulders 18 and 20 at either end of the counterbore 14 to provide sealing engagement therebetween. In addition, ports 22, 24, and 26 may be threaded or otherwise constructed to provide for the connection of fluid sources and any mechanisms to which the fluid will be supplied. As is readily apparent, the valve may be constructed in any conventional manner in order to facilitate the insertion and removal of the shuttle within the valve body.

In operation, fluid is supplied from two sources to inlet ports 24 and 26 in order to control the application of fluid to the outlet 22. As can be seen, when the fluid pressure from one of the sources is greater than fluid pressure from the other of the sources, the shuttle 16 is forced to one position within the valve body 10. In the present example, fluid from the primary source supplied to port 24 forces the shuttle to the position shown in FIG. 1 such that the bevel 28 of the shuttle 16 engages the shoulder 18 and precludes fluid flow from the source at port 26. As long as the pressure of the fluid from the fluid source at port 24 exceeds the pressure from the source at port 26, the shuttle 16 will be maintained in the position shown and fluid at port 24 flows to the outlet at 22. However, following a drop in pressure at port 24 so that the pressure from the secondary source at port 26 exceeds the pressure at port 24, the shuttle will be forced to the opposite end of the counterbore 14. At that time, the shuttle maintains a position in which the bevel 20 contacts the shoulder 20 and prevents the flow of fluid from port 24. Fluid from source 26 will thereafter flow from the port 26, through the outlet 22, and to the desired mechanism.

In situations where the fluid pressures from the primary and secondary sources are not normally equal, the above-described valve operates to provide a fluid supply from a secondary source upon a failure or drop in pressure at the primary source. However, if pressure at ports 24 and 26 is normally equal, the shuttle 16 will act in one of the two previously noted modes. In the first mode, the shuttle 16 will be positioned substantially midway between the ports 24 and 26 and thereby block fluid flow from either of the sources to the outlet 22. In the other mode, the shuttle 16 will oscillate between the shoulders 18 and 20 in an unstable condition such that fluid is alternately supplied from ports 24 and 26 to outlet 22. In both cases, the operation of the shuttle valve is unstable since fluid control from only one source cannot be achieved. Accordingly, the present invention has been constructed to provide a solution for the above problems and to enable stable operation of the shuttle valve even when the initial pressure of the primary and secondary sources may be equal.

Figure 2:
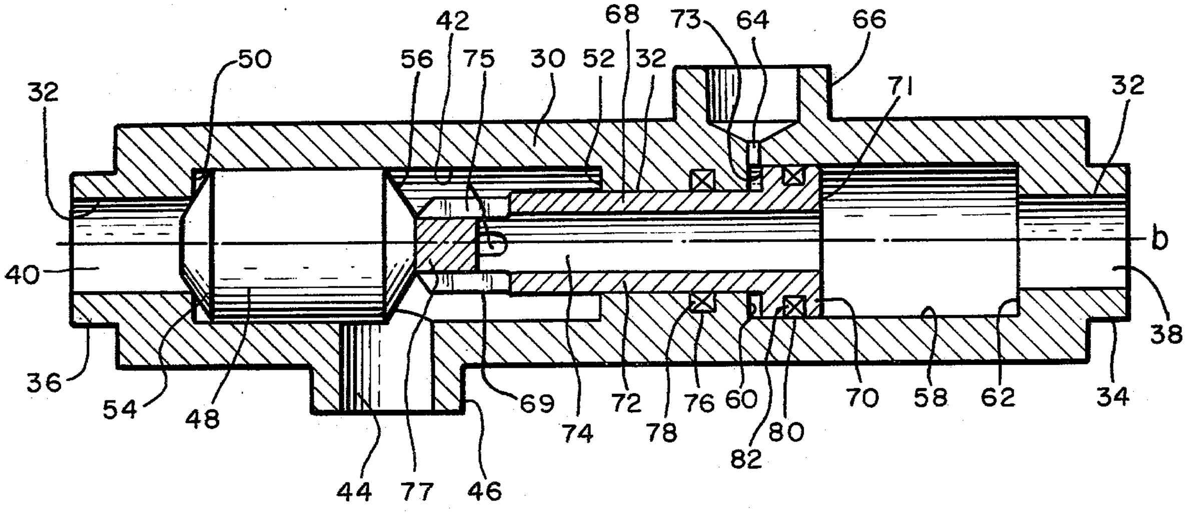
FIG. 2 is a schematic diagram of a pressure biased shuttle valve constructed in accordance with the present invention.

Referring now to FIG. 2, a shuttle valve according to the present invention is shown to include an elongate valve body 30 having a cylindrical bore 32 having an axis b extending along the length of the body 30. At either end of body 30 reduced diameter portions 34 and 36 form fluid ports 38 and 40 for coupling the bore to primary and secondary fluid sources (not shown). The portions 34 and 36 may be threaded or constructed in any conventional manner to facilitate mechanical coupling to corresponding elements on the fluid sources. At one end of the valve body 30, a generally cylindrical counterbore 42 extends along axis b within the valve body and has a diameter greater than the bore 32 so as to form shoulders 50 and 52 at either end thereof. The counterbore 42 has a generally cylindrical shuttle 48 located therein for slidable movement along the axis of the counterbore in a manner similar to the description of FIG. 1. At either end of the counterbore 42 the shoulders 50 and 52 provide for sealing engagement with the bevels 54 and 56 of the shuttle 48 to prevent fluid flow following engagement of the shuttle in the same manner as described with reference to FIG. 1. A first channel 44 extends through the valve body to intersect the bore 42 and form an outlet port for fluid from ports 38 and 40. A reduced diameter portion 46 surrounding the bore 44 may be constructed in a manner similar to portions 34 and 36 for coupling the outlet fluid to a suitable mechanism to be controlled.

A second counterbore 58 spaced axially from the counterbore 42 along the axis b is formed in a second portion of the valve body 30 and also extends axially therethrough with a diameter greater than the bore 32 to form shoulders 60 and 62 at either end thereof. In addition, a channel 64 extends through the valve body to within the counterbore 58 at a point adjacent to the shoulder 60. The channel 64 may be vented to the atmosphere or the portion 66 constructed to enable coupling of the channel 64 to a source (not shown) of variable pressure. A bias piston 68 is slidably retained within the bore 32 between the counterbores 42 and 58 and contacts the shuttle at one end 69. The bias piston includes a cylindrical main body portion 72 extending through bore 32, an axial channel 74, and a cylindrical end portion 70 (forming annular end faces 71 and 73) having a diameter less than the inside diameter of the counterbore 58. The channel 74 extends through the bias piston 68 to allow fluid flow between the counterbore 58 and the counterbore 42. The end 69 includes a generally cylindrical contact portion 77 which abutts against one end of the shuttle 48 and slots 75 circumferentially spaced around the body 72 of the bias piston to allow fluid transfer from the channel 74 to the counterbore 42. The bore 32 between the counterbores 42 and 58 includes a recess 76 containing a sealing ring 78 in order to provide a seal against fluid flow between the surface of the body 72 and the bore 32. The cylindrical portion 70 also includes a recess 80 having a sealing ring 82 to provide for sealing engagement between the surface of cylinder 70 and counterbore 58 to prevent fluid flow therebetween. The identified seals may be O-rings or any other conventional seal. It should be noted that the channel 64 must be designed to intersect the counterbore 58 at a position which allows the channel to remain open at all times during movement of the portion 70 within counterbore 58.

The operation of the valve will now be described with reference to FIG. 2. For purposes of the present explanation, it is assumed that the ports 38 and 40 are coupled to equal pressure primary and secondary fluid sources, respectively, in the manner known in the art. In a like manner, the outlet 44 is coupled through portion 46 to the mechanism which is to be controlled by the alternate sources supplying fluid to ports 38 and 40. In FIG. 2, the valve is shown in its normal position while pressurized from both primary and secondary sources. In this position, the pressure supplied at port 38 acts against the bias piston on annular face 71 so that the net bias force to keep the shuttle 48 in the position shown, is equal to the effective piston area open to port 64 multiplied by the difference in pressures at ports 38 and 64. Thus, the amount of bias force on the shuttle may be adjusted during the design of the bias piston by varying the areas of the annular surfaces 71 and 73. Alternatively, the bias force may be controlled by varying the bias pressure applied to port 64 for a fixed design of the surface areas 71 and 73.

As can be seen, since the remainder of the force balance on the shuttle 48 is the same as for the shuttle of FIG. 1 (i.e. fluid flow through 74 provides fluid pressure through slots 75 to the end of the shuttle), the force of the bias piston acts to maintain the shuttle in the position shown. At this time, the bevel 54 of the shuttle 48 contacts the shoulder 50 to preclude fluid flow from the secondary source through the port 40. At the same time, fluid from the primary source flows from the counterbore 58 through the channel 74 and slots 75 to the outlet 44 and thus to the mechanism which is to receive the fluid. So long as the pressure from the primary source is maintained at a value greater than the pressure of the secondary source minus the bias pressure (effective pressure exerted by the bias piston), the shuttle will remain in the position shown. However, when the pressure of the primary source becomes less than the pressure of the secondary source minus the bias pressure, the fluid from the secondary source will force the shuttle and the bias piston to a position where the bevel 56 will engage the shoulder 52 to prevent fluid flow from port 38. At this time, fluid from the secondary source will flow from port 40 to the outlet 44 and then to the mechanism to be controlled. Since the pressure at port 64 may be supplied at various values, the effective pressure required by the primary source to maintain stable operation may be varied over a range of values. Thus, by increasing or decreasing the effective areas of faces 71 and 73 and the pressure at channel 64, the shuttle valve can be constructed to respond to a variety of pressure characteristics that may be present in different environments. Particularly, when the pressures at ports 38 and 40 are equal, the shuttle may be operated without oscillation or fluid blockage by initially adjusting the effective area of the bias piston and the pressure supplied at channel 64 to place the shuttle in the position shown. At that time, the shuttle will provide initial fluid flow from port 38 and thereafter respond to pressure changes in the manner similar to the values of the prior art.

As can be seen from the above description, the present device provides a relatively simple solution to the problems caused by equal pressures from primary and secondary fluid sources. The present device accomplishes that purpose without requiring a spring bias or detent configuration or any other configuration which would deplete fluid energy and prevent stable operation. In addition, the bias control can be altered very simply by controlling the fluid pressure at port 64 and/or the effective surface area of faces 71 and 73. This enables the valve to be employed with a variety of fluid sources without changing the configuration of the valve structure. The structure is therefore more adaptable to the particular environment in which it is used. In addition, the construction and control of the bias through channel 64 allows operation of the shuttle with primary and secondary sources of unequal pressures through a range of values determined by effective piston area and bias source pressure.

While the invention has been described with particular reference to FIG. 2, it will be apparent that other configurations of the device may be employed in accordance with the present teachings. In particular, the device of FIG. 2 has been described to have a generally cylindrical configuration with cylindrical bores, cylindrical counterbores, and appropriate configurations of cooperating elements. It should be apparent that other configurations of the device could be used without departing from the teachings of the present invention so long as the noted cooperation between the elements if maintained. In addition, the device has been described with reference to the schematic diagram of FIG. 2 without showing the specific coupling connections which allow the construction of the device. It should be apparent that various threaded or mechanical couplings may be used to enable the insertion of the shuttle, bias piston, and appropriate cooperating sealing rings within the valve body 30 and for coupling to the various supply, outlet, and bias sources. It should be further noted that the shuttle is dimensioned so that when positioned to block a fluid flow from one source, an appropriate opening between one end of the shuttle and the outlet allows fluid flow from the other of the two alternate sources.

Obviously, many other modifications and variations of the present invention are possible in light of the above teachings. It is therefore to be understood that within the scope of the appended claims, the invention may be practiced otherwise than as specifically described.

What is claimed and desired to be secured by Letters Patent of the United States is:

1. An improved shuttle valve apparatus comprising:

an elongate valve body;

a bore extending through said body;

first and second counterbores axially spaced within said valve body along said bore, first and second ports communicating with said bore at opposite ends thereof;

a third port intersecting said bore between said first and second ports;

a shuttle slidably disposed within said first counterbore and cooperating in such manner as to allow selective communication between one of said first and second ports and said third port in response to fluid pressure at said first and second ports, and means for biasing said shuttle in a first position to allow initial fluid flow from one of said first and second ports to said third port, said means for biasing including a bias piston disposed within said second counterbore and coupled to contact said shuttle and responsive to fluid pressure at one of said ports to move said shuttle to said first position, and a channel in said valve body communicating with said second counterbore and cooperating in such manner as to provide a differential pressure to a portion of the bias piston which enables the bias piston to move the shuttle to said first position in response to fluid pressure from one of said first and second ports.

2. The apparatus of claim 1 wherein said bias piston comprises;

a first portion extending axially along the bore between the first and second counterbores and having one end abutting the shuttle, a second portion attached to said first portion and slidably retained within said second counterbore for movement therein, a passage extending through said first and second portions to allow fluid communication between said first and second counterbores.

3. The apparatus of claim 2 wherein said first portion includes a plurality of slots positioned to allow fluid flow from the passage of the bias piston to the first counterbore and to the third port when said shuttle is in the first position.

4. The apparatus of claim 2 wherein said bore and counterbores have a cylindrical configuration, and wherein the shuttle has a generally cylindrical configuration which slidably engages the first counterbore, and said bias piston includes a generally cylindrical first portion slidably engaging said bore and a cylindrical second portion slidably engaging said second counterbore.

5. The apparatus of claim 2 wherein said first portion includes seal means for preventing fluid flow between adjacent surfaces of said first portion and said bore and wherein said second portion includes seal means for preventing fluid flow between adjacent surfaces of said second portion and said second counterbore.

6. The apparatus of claim 2 wherein said means for biasing further includes a channel communicating with said second counterbore and wherein said second portion of said bias piston is constructed to have two opposed piston surfaces with one of said surfaces exposed to fluid pressure provided at the port communicating with said second counterbore and the other of said surfaces exposed to fluid pressure provided through said channel.

7. The apparatus of claim 6 wherein the force provided by said bias piston to move said shuttle to said first position is determined by the area of the other of said piston surfaces and the pressure differential between the opposed piston surfaces.

8. The apparatus of claim 6 further including means coupled to said channel for providing a variable fluid pressure to the other of said piston surfaces to vary the force provided by the bias piston to move said shuttle to said first position.

* * * * *